US007002319B2

(12) United States Patent
Hinteregger

(10) Patent No.: US 7,002,319 B2
(45) Date of Patent: Feb. 21, 2006

(54) CABLE RAILROAD SYSTEM

(75) Inventor: Christoph Hinteregger, Wolfurt (AT)

(73) Assignee: Innova Patent GmbH, Wolfurt (AT)

( * ) Notice: Subject to any disclaimer, the term of this patent is extended or adjusted under 35 U.S.C. 154(b) by 90 days.

(21) Appl. No.: 10/619,160

(22) Filed: Jul. 14, 2003

(65) Prior Publication Data

US 2004/0041541 A1 Mar. 4, 2004

(30) Foreign Application Priority Data

Sep. 3, 2002 (AT) .............................. A 1312/2002

(51) Int. Cl.
H02J 7/00 (2006.01)
(52) U.S. Cl. ...................................... 320/110; 320/112
(58) Field of Classification Search ................ 320/112, 320/110, 128, 111, 137; 104/165, 173, 112, 104/28, 245, 124, 173.1, 173.2, 178, 89; 105/149.1, 149.2, 150, 50
See application file for complete search history.

(56) References Cited

U.S. PATENT DOCUMENTS

| 3,621,192 | A | * | 11/1971 | Pohler | 219/217 |
| 3,794,132 | A | * | 2/1974 | Moon | 180/13 |
| 5,839,788 | A | * | 11/1998 | Orr, III | 297/452.41 |
| 6,051,954 | A | * | 4/2000 | Nagao et al. | 320/101 |
| 6,453,824 | B1 | * | 9/2002 | Dobbins | 105/149.1 |

* cited by examiner

Primary Examiner—Donald Sparks
Assistant Examiner—Lawrence Luk
(74) Attorney, Agent, or Firm—Laurence A. Greenberg; Werner H. Stemer; Ralph E. Locher

(57) ABSTRACT

A cable railroad system has a load-bearing and traction cable and a large number of chairs. The chairs are provided with coupling devices with which they can be coupled to the load-bearing and traction cable. Here, the seats of the chairs are constructed with electric heating devices and also with batteries for feeding the heating devices. The system also has devices for charging up the batteries.

5 Claims, 6 Drawing Sheets

FIG. 2
FIG. 2A
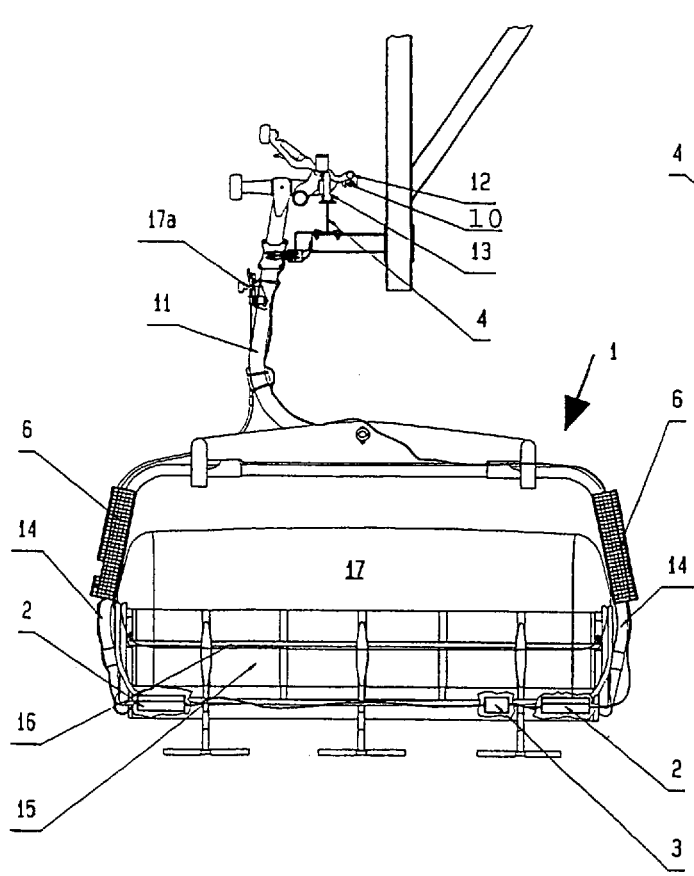
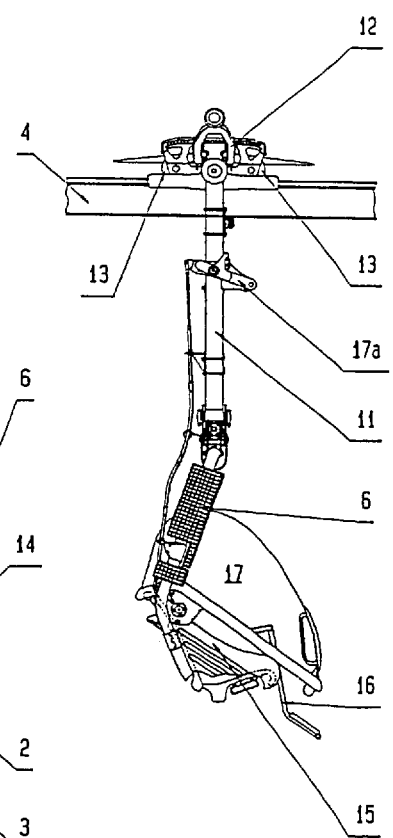

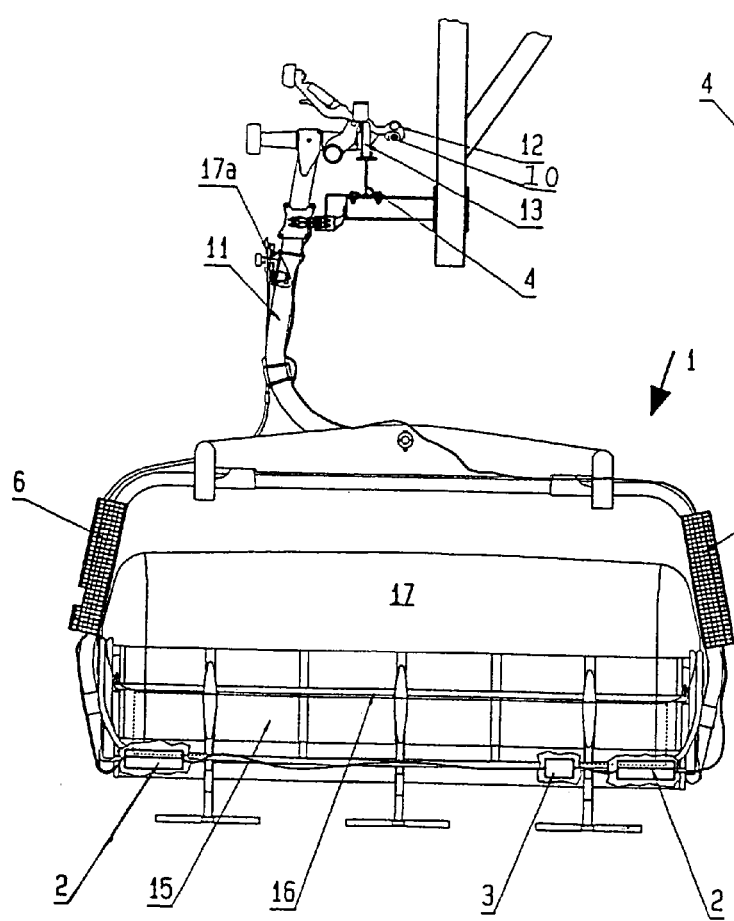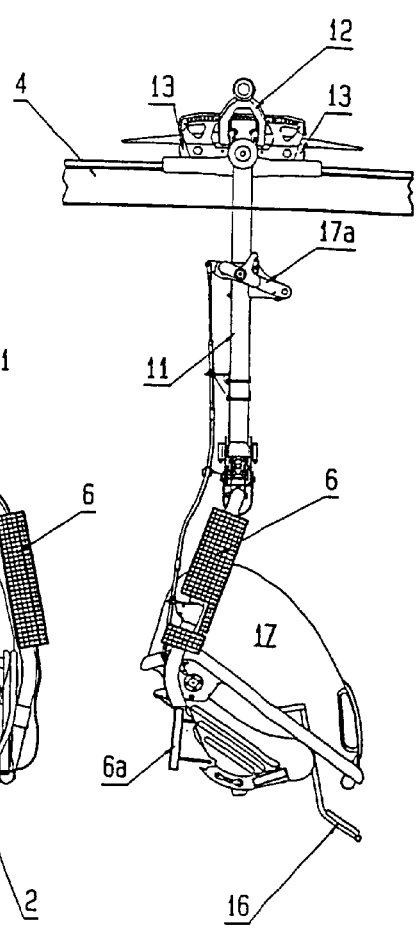

CABLE RAILROAD SYSTEM

BACKGROUND OF THE INVENTION

Field of the Invention

The present invention relates to a cable railroad system comprising a load-bearing and traction cable and a large number of chairs. The chairs are provided with coupling devices by means of which they can be coupled to the load-bearing and traction cable.

It has become known to equip the chairs of cable railroad systems with pivotable hoods, by way of which their seats can be protected against unfavorable climatic conditions, for example against snowfall, during the operation of the cable railroad system. However, since only limited protection of the seating against cold is achieved by hoods of this type, at low temperatures, which can occur in particular in chairlift systems at high altitude, very severe cooling of the seating areas of the chairs can occur. In view of the fact that greater and greater requirements are placed on the comfort of cable railroad systems, this therefore constitutes a critical disadvantage for the operation of cable railroad systems with chairs.

SUMMARY OF THE INVENTION

It is accordingly an object of the invention to provide a cable railroad system which overcomes the above-mentioned disadvantages of the heretofore-known devices and methods of this general type.

With the foregoing and other objects in view there is provided, in accordance with the invention, a cable railroad system, comprising:
 a load-bearing and traction cable;
 a plurality of chairs mounted to coupling devices for selectively coupling the chairs to the load-bearing and traction cable;
 the chairs having seats with electric heating devices, batteries connected to supply the heating devices with energy; and
 devices for charging the batteries.

In other words, the objects of the invention are achieved in that the seats of the chairs are constructed with electric heating devices and also with batteries, by means of which these heating devices can be supplied, and also with devices for charging up the batteries. In addition, the chairs can be constructed with control devices, by means of which the heating of the seats is controlled.

Busbars are preferably provided in the stations, by means of which the batteries are charged up during the garaging of the chairs. Furthermore, busbars can be provided in the stations, by means of which the batteries are charged up during the movement of the chairs through the stations.

According to a further preferred embodiment, the chairs are constructed with photovoltaic elements which are used to charge up the batteries.

Other features which are considered as characteristic for the invention are set forth in the appended claims.

Although the invention is illustrated and described herein as embodied in a cable railroad system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 shows the chair of a cable railroad system according to the invention on the way, in front view;

FIG. 2A is a side view of the chair according to FIG. 2;

FIG. 3 is a front view of a second embodiment of a chair of a cable railroad system according to the invention;

FIG. 3A is a side view of the chair according to FIG. 3;

DESCRIPTION OF THE PREFERRED EMBODIMENTS

Figure 1:
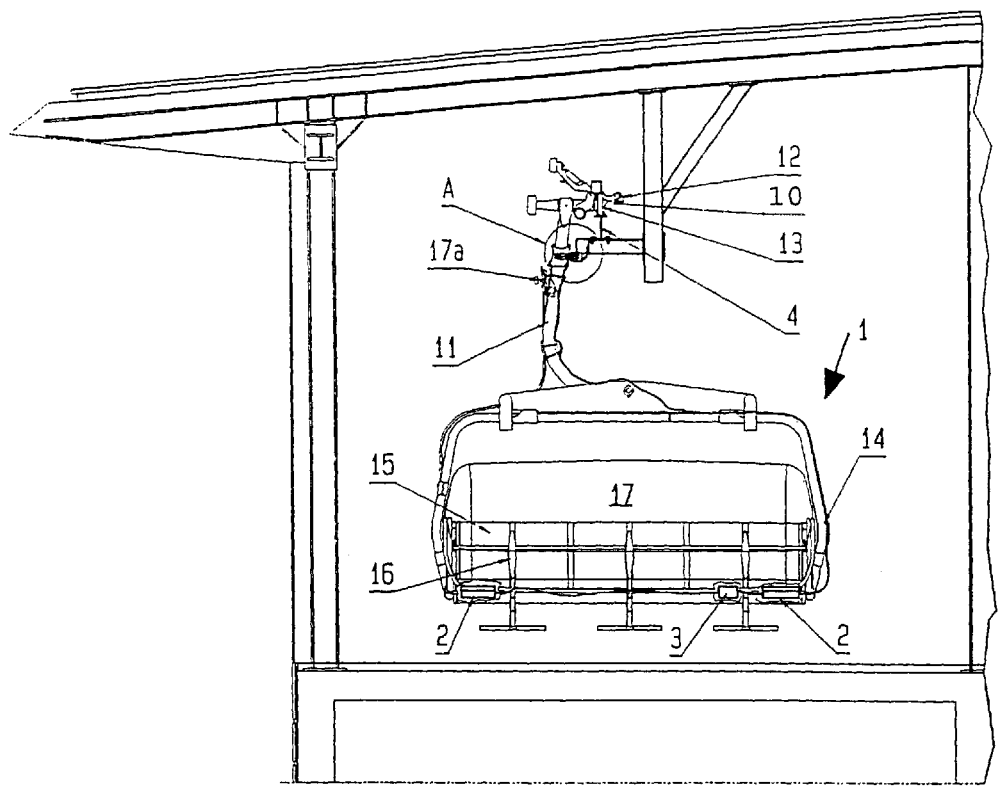
FIG. 1 shows a chair located in a station of a cable railroad system according to the invention, in front view.

Referring now to the figures of the drawing in detail and first, particularly, to FIG. 1 thereof, there is shown a station of a cable railroad system, or cableway system, according to the invention. The system illustrated herein transports a chair 1 for six persons. This chair 1 comprises a load-bearing rod 11, at the upper end of which a coupling device 12 and a trolley 13 are provided, and a load-bearing frame 14, on which there is a bench 15 and on which a locking bow 16 is pivotably mounted. In addition, the chair 1 is constructed with a hood 17, which can be pivoted by means of a control device 17a.

The chair 1 can be coupled to the load-bearing and traction cable of the cable railroad system by way of the coupling device 12. By means of the trolley 13, the chair 1, in the stations in which it is uncoupled from the load-bearing and traction cable, can be guided through the stations along the guide rails 4.

The seating areas of the chairs 1 are in each case constructed with a heating device. In order to supply these heating devices with the required energy, two batteries 2 and a control device 3 are provided on each chair 1. The assembly is located underneath the seating area. The charging of the batteries 2 can firstly be carried out outside the operating times of the cable railroad system during the garaging of the chairs 1. Secondly, it can also be carried out during the operation of the cable railroad system during the movement of the chairs 1 through the stations. In addition, the charging of the batteries 2 can be carried out by means of photovoltaic elements. Since the chairs 1 are uncoupled from the load-bearing and traction cable in the stations and are guided through the stations along the guide rails 4 at a speed which is reduced substantially with respect to the traction speed of the load-bearing and traction cable, a period of at least 20 seconds is available to charge the batteries.

Figure 1A:
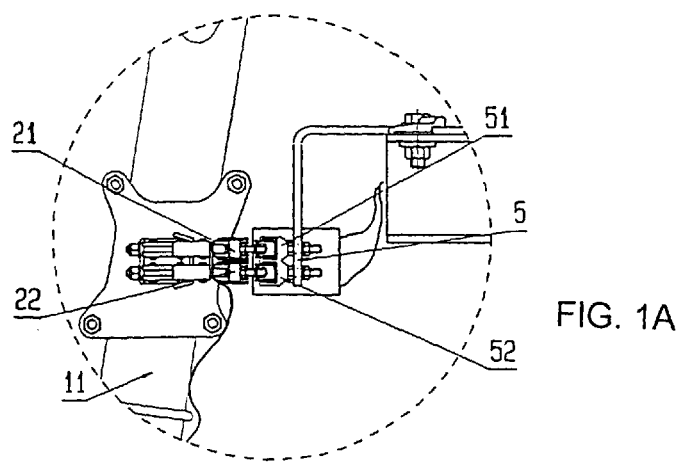
FIG. 1A shows the detail A in FIG. 1, on an enlarged scale with respect to FIG. 1.

As can be seen in particular from FIG. 1A, for this purpose there are in the stations busbars 5 having two current conductors 51 and 52 to which current collectors 21 and 22 on the load-bearing bar 11 are assigned. Via these current collectors 21 and 22, the batteries 2 are fed with current as the chairs 1 travel through the stations.

The control device 3 is used for the purpose of controlling the heating of the seating areas of the chairs 1. In this case, provision is made to heat the seating areas as soon as the chairs 1 move into the stations and are then used, this being the case in particular for the seating areas which were not occupied when the chairs moved into the stations, for which reason they have cooled down to a great extent during their movement across their travel path.

For this purpose, temperature sensors are preferably also provided in the seating areas, their outputs being connected to the control devices 3.

The chair 1 illustrated in FIGS. 2 and 2A differs from the chair 1 according to FIG. 1 in that, on both sides of the load-bearing frame 14, it is constructed with photovoltaic elements 6, by means of which the batteries 2 are also fed with current as the chair 1 travels over the way and, as a result, are charged up.

In the exemplary embodiment according to FIGS. 3 and 3A, a further photovoltaic element 6a is arranged on the rear of the chair 1.

Figure 4:
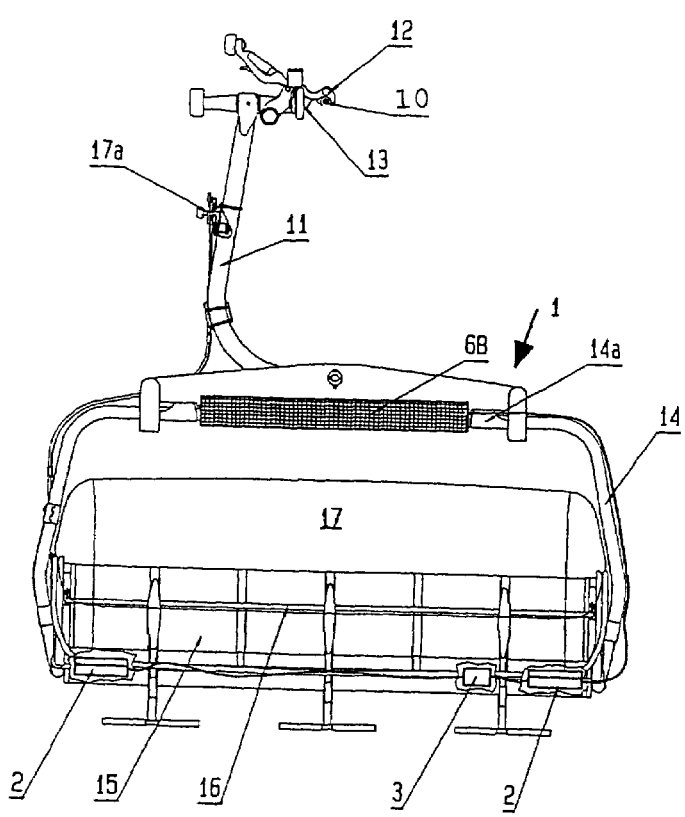
FIG. 4 is a front view of a third embodiment of a chair of a cable railroad system according to the invention.
Figure 4A:
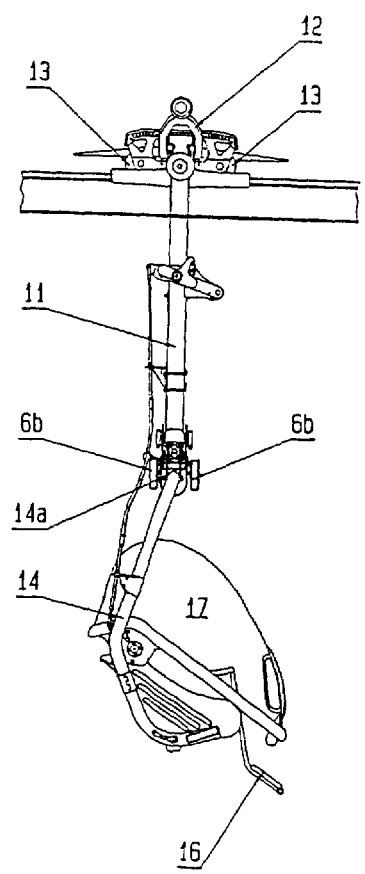
FIG. 4A is a side view of the chair according to FIG. 4.

In the exemplary embodiment according to FIGS. 4 and 4A, two photovoltaic elements 6b are arranged on the front side and on the rear of the horizontal beam 14a of the load-bearing frame 14, above the bench 15.

Figure 5:
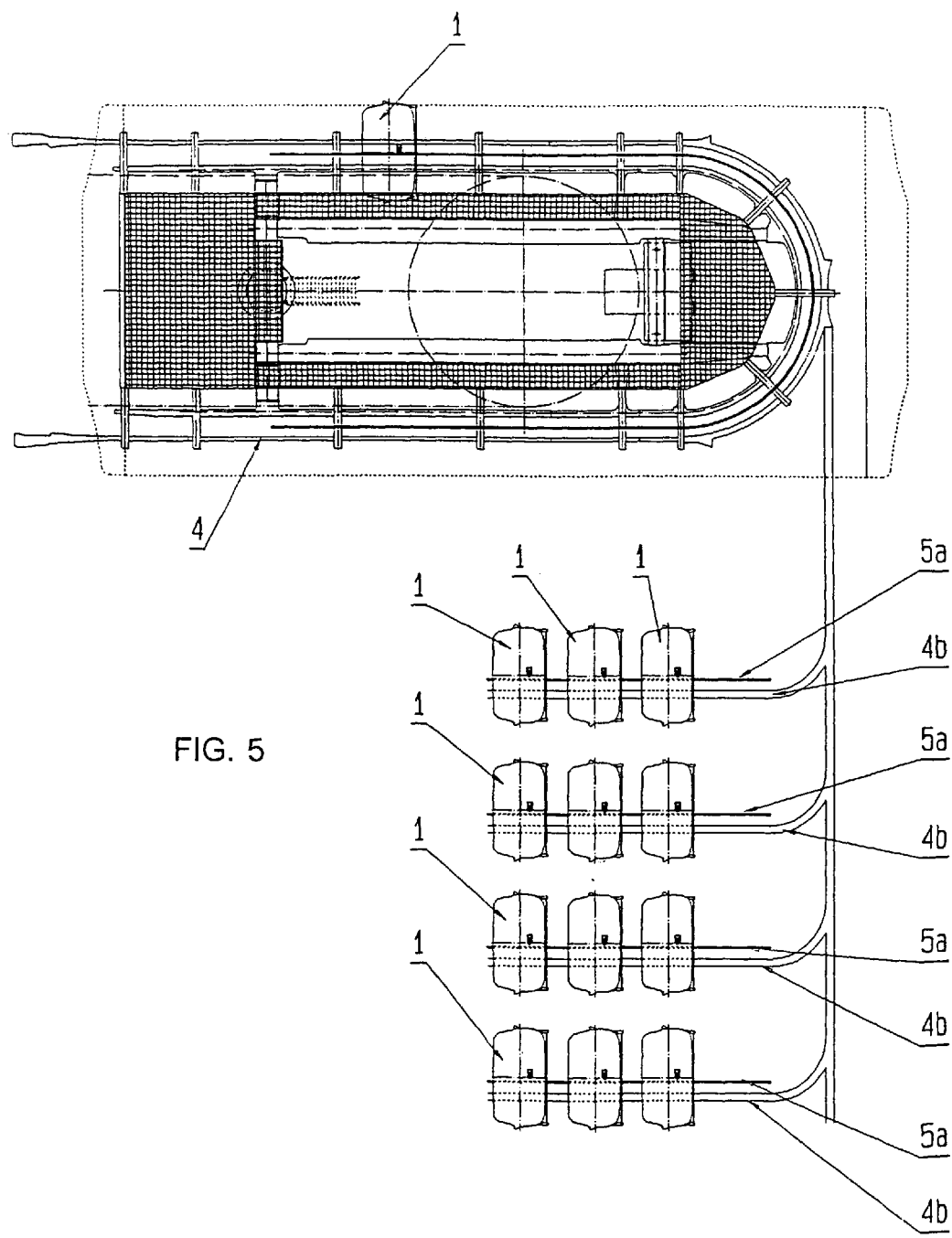
FIG. 5 is a plan view onto a storage system, provided in a cable railroad system according to the invention, for a large number of chairs.

One of the stations of the cable railroad system is illustrated in FIG. 5, through which station the chairs 1 are moved along the guide rails 4 during the operation of the cable railroad system. In this case, the station is assigned a system for storing the chairs 1 outside the operating times of the system. This storage system has a plurality of storage rails 4b, which can be connected to the guide rails 4 by way of a connecting rail 4a on which the chairs 1 can be displaced in order to store them outside the operating times of the cable railroad system. The storage rails 4b are assigned busbars 5a, via which the batteries 2 can be charged up by means of the current collectors 21, 22 during the storage of the chairs 1.

Figure 6:
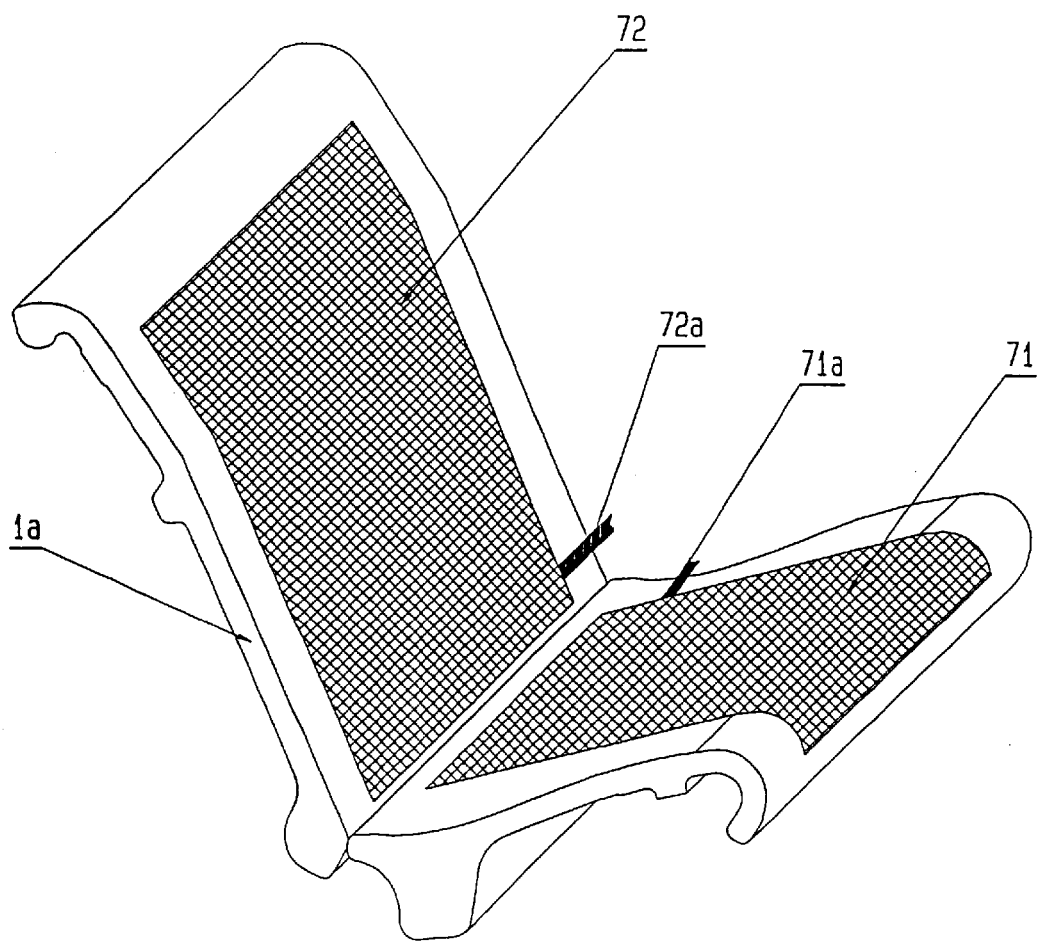
FIG. 6 is an axonometric view of the seating area of a chair of a cable railroad system according to the invention.

Finally, FIG. 6 illustrates a seat 1a which is constructed with heating elements 71 and 72 both in its seat area and in its back area, which are connected to the batteries 2 via terminals 71a and 72a, with the interposition of the control circuit 3.

I claim:

1. A cable railroad system, comprising:
    a load-bearing and traction cable;
    a plurality of chairs mounted to coupling devices for selectively coupling said chairs to said load-bearing and traction cable;
    said chairs having seats with electric heating devices, batteries connected to supply said heating devices with energy; and
    devices for charging said batteries, including busbars disposed in stations of the cable railroad system and configured to charge said batteries during a movement of said chairs through the stations.

2. The cable railroad system according to claim 1, which further comprises control devices for controlling a heating of said seats.

3. The cable railroad system according to claim 2, wherein said control devices are disposed on said chairs.

4. A cable railroad system, comprising:
    a load-bearing and traction cable;
    a plurality of chairs mounted to coupling devices for selectively coupling said chairs to said load-bearing and traction cable;
    said chairs having seats with electric heating devices;
    batteries connected to supply said heating devices with energy; and
    devices for charging said batteries, including busbars disposed in stations of the cable railroad system and configured to charge said batteries during a garaging of said chairs.

5. A cable railroad system, comprising:
    a load-bearing and traction cable;
    a plurality of chairs mounted to coupling devices for selectively coupling said chairs to said load-bearing and traction cable;
    said chairs having seats with electric heating devices, batteries connected to supply said heating devices with energy, and photovoltaic elements mounted to said chairs for charging up said batteries.

* * * * *